United States Patent
Eavenson, Sr. et al.

(10) Patent No.: US 9,338,942 B2
(45) Date of Patent: **\*May 17, 2016**

(54) REPLACEABLE MOWER BLADE AND ASSEMBLY

(71) Applicant: MTD Products Inc, Valley City, OH (US)

(72) Inventors: Jimmy N. Eavenson, Sr., Aurora, OH (US); Axel Schaedler, Olmsted Falls, OH (US); Dave Hein, Elyria, OH (US); Robert L. Jira, Jr., Middleburg Heights, OH (US)

(73) Assignee: MTD PRODUCTS INC, Valley City, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/541,623

(22) Filed: Nov. 14, 2014

(65) Prior Publication Data

US 2015/0068185 A1   Mar. 12, 2015

Related U.S. Application Data

(63) Continuation of application No. 13/766,824, filed on Feb. 14, 2013, now Pat. No. 8,935,909, which is a continuation-in-part of application No. 13/494,473, filed on Jun. 12, 2012, now Pat. No. 8,931,248.

(51) Int. Cl.
   *A01D 34/73* (2006.01)
(52) U.S. Cl.
   CPC .............. *A01D 34/733* (2013.01); *A01D 34/73* (2013.01)
(58) Field of Classification Search
   USPC .................................................. 56/255, 295
   See application file for complete search history.

(56) References Cited

U.S. PATENT DOCUMENTS

| 1,558,021 | A | 10/1925 | Libi |
| 1,996,813 | A | 4/1935 | Jeppsson |
| 2,167,222 | A | 7/1939 | Shelor |
| 2,232,261 | A | 2/1941 | Orr |
| 2,477,442 | A | 7/1949 | Cramer, Jr. et al. |
| 2,527,472 | A | 10/1950 | Wolf |
| 2,651,159 | A | 9/1953 | Roundtree, Sr. |
| 2,924,059 | A | 2/1960 | Beeston, Jr. |
| 2,963,844 | A | 12/1960 | Engler |

(Continued)

FOREIGN PATENT DOCUMENTS

| EP | 115853 | 8/1984 |
| FR | 2792162 | 10/2000 |

(Continued)

OTHER PUBLICATIONS

International Search Report and Written Opinion dated Jun. 4, 2014 for corresponding International Patent Application No. PCT/US2014/016436.

(Continued)

*Primary Examiner* — Alicia Torres
(74) *Attorney, Agent, or Firm* — Wegman, Hessler & Vanderburg (57) ABSTRACT

A replaceable mower blade for attachment to a mounting member operatively connected to a mower is provided. The blade includes a central portion having opposing side edges, a top surface, and a bottom surface. The blade also includes a tip portion extending from the central portion. The central portion includes at least one attachment mechanism for operatively connecting the blade to the mounting member.

13 Claims, 8 Drawing Sheets

(56) References Cited

U.S. PATENT DOCUMENTS

| | | | |
|---|---|---|---|
| 3,050,925 A | 8/1962 | Robinson et al. | |
| 3,103,093 A | 9/1963 | House, Jr. | |
| 3,152,432 A | 10/1964 | Scarnato et al. | |
| 3,243,944 A | 4/1966 | Michaud | |
| 3,321,894 A | 5/1967 | Ingram | |
| 3,327,460 A | 6/1967 | Blackstone | |
| 3,395,522 A | 8/1968 | Zweegers | |
| 3,504,485 A * | 4/1970 | Johnson | 56/295 |
| 3,563,015 A | 2/1971 | Renfroe | |
| 3,683,606 A | 8/1972 | Staines | |
| 3,698,168 A | 10/1972 | Mott et al. | |
| 3,949,541 A | 4/1976 | Henry | |
| 3,958,402 A | 5/1976 | Bouet | |
| 4,176,508 A | 12/1979 | Baumann et al. | |
| 4,229,933 A | 10/1980 | Bernard | |
| 4,313,297 A | 2/1982 | Maier | |
| 4,375,148 A | 3/1983 | Beck | |
| 4,413,468 A | 11/1983 | Hockersmith | |
| 4,586,257 A | 5/1986 | Rittenhouse | |
| 4,611,459 A | 9/1986 | Cartner | |
| 4,696,432 A | 9/1987 | Russ et al. | |
| 4,712,364 A | 12/1987 | Oxley | |
| 4,750,320 A | 6/1988 | Liebl | |
| 4,815,264 A | 3/1989 | Mijnders | |
| 4,936,884 A | 6/1990 | Campbell | |
| 5,018,347 A | 5/1991 | Feilen | |
| 5,019,113 A | 5/1991 | Burnell | |
| 5,271,212 A | 12/1993 | Anderson | |
| 5,287,686 A | 2/1994 | Lindsay | |
| 5,383,329 A | 1/1995 | Cornell, III et al. | |
| 5,438,819 A | 8/1995 | Dallman | |
| 5,454,216 A | 10/1995 | Myszka | |
| 5,502,958 A | 4/1996 | Plamper | |
| 5,575,071 A | 11/1996 | Phillips et al. | |
| 5,724,796 A | 3/1998 | Plamper | |
| 5,791,131 A | 8/1998 | Hill et al. | |
| 5,839,263 A | 11/1998 | Biernath et al. | |
| 5,862,598 A | 1/1999 | Lee | |
| 5,881,540 A | 3/1999 | Miller | |
| 5,946,895 A | 9/1999 | Martens | |
| 6,182,430 B1 | 2/2001 | Blarek et al. | |
| 6,205,755 B1 | 3/2001 | Bontrager et al. | |
| 6,367,235 B1 | 4/2002 | Moynihan | |
| 6,470,661 B1 | 10/2002 | Plamper | |
| 6,612,039 B2 | 9/2003 | Kakiuchi et al. | |
| 6,769,236 B2 | 8/2004 | Schaedler | |
| 6,935,095 B1 | 8/2005 | Sluder | |
| 7,703,268 B2 | 4/2010 | Yanke | |
| 7,775,026 B2 | 8/2010 | Bever | |
| 7,871,080 B2 | 1/2011 | Marini et al. | |
| 7,958,710 B2 | 6/2011 | Gilpatrick et al. | |
| 8,136,333 B1 | 3/2012 | Levin et al. | |
| 8,931,248 B2 * | 1/2015 | Eavenson, Sr. | A01D 34/733 56/17.5 |
| 8,935,909 B2 * | 1/2015 | Eavenson, Sr. | A01D 34/733 56/255 |
| 2002/0106279 A1 | 8/2002 | Selby | |
| 2004/0035010 A1 | 2/2004 | Kakiuchi et al. | |
| 2004/0093842 A1 | 5/2004 | Cooper | |
| 2005/0210852 A1 | 9/2005 | Lancaster | |
| 2005/0229573 A1 | 10/2005 | Curran | |
| 2006/0156706 A1 | 7/2006 | Eavenson et al. | |
| 2006/0168933 A1 | 8/2006 | Hill, Jr. | |
| 2006/0230622 A1 | 10/2006 | Skluzak | |
| 2008/0277127 A1 | 11/2008 | Dixon | |
| 2009/0308045 A1 | 12/2009 | Bever | |
| 2010/0101201 A1 | 4/2010 | Yanke | |
| 2010/0257832 A1 | 10/2010 | Smith | |
| 2012/0110970 A1 | 5/2012 | Blarek | |
| 2013/0327007 A1 | 12/2013 | Eavenson, Sr. et al. | |

FOREIGN PATENT DOCUMENTS

| | | |
|---|---|---|
| NL | 8403911 | 7/1986 |
| WO | 2013188335 | 12/2013 |

OTHER PUBLICATIONS

International Search Report and Written Opinion dated Feb. 17, 2014 for corresponding International Patent Application No. PCT/US2013/045076.

Husqvarna introduces a tool-free way to change mower blades; consumerreports.org; Oct. 29, 2012.

Groundkeeper; Amazone; Mar. 2, 2014.

* cited by examiner

REPLACEABLE MOWER BLADE AND ASSEMBLY

CROSS-REFERENCE TO RELATED APPLICATIONS

The present application is a continuation application and claims the benefit of Ser. No. 13/766,824 filed on Feb. 14, 2013, which is a continuation-in-part of Ser. No. 13/494,473 filed on Jun. 12, 2012, all of which are hereby incorporated by reference in their entirety.

FIELD OF THE INVENTION

The present invention relates to lawn and garden equipment, and more particularly, to a replaceable blade assembly for a mower.

BACKGROUND OF THE INVENTION

Lawn mowers such as walk-behind mowers, riding mowers, garden tractors, and the like include a cutting deck that includes at least one cutting blade configured to cut grass and other vegetation. However, the cutting blade often contacts rocks, tree branches, or other debris which causes the blade to dull or otherwise become ineffective. Typical changeable blades for rotary mowers include one-piece blades that are attached and retained using hardware which requires tools to remove and replace the blade, pivot-blades attached onto one-piece mounting plates which also require tools to remove and replace the blade, and one-piece blades that are attached and retained but do not require tools for removal and replacement. Replacement of the one-piece blades involves replacing the entire blade even though one of the sharpened edges may not need replacement. Also, the one-piece blades are also typically designed for finish-cut operations, and where durability and impact strength are major concerns, damage to spindles, motors and engine crankshafts with one piece blades might not be avoidable. Pivot-blades are often used in rough-cut operations and typically do not produce high cutting quality.

For high quality cutting operations, the cutting blades need to be stable and solidly retained to provide the highest quality of cut and safe operation.

Therefore, a need exists for a mower blade assembly having replaceable blades that can be easily replaced without the need for tools. A need also therefore exists for a mower blade assembly in which the blades are replaceable and self-securing while also being easily removable.

BRIEF SUMMARY OF THE INVENTION

According to one aspect of the present invention, a replaceable blade for attachment to a mounting member of a lawn mower is provided. The replaceable blade includes a central portion having an upper surface, a lower surface, opposing side edges, and an end extending between the side edges. The replaceable blade also includes a tip portion extending from the central portion opposite the end. The replaceable blade further includes at least one attachment mechanism included on the central portion.

According to another aspect of the present invention, a replaceable blade for attachment to a mounting member of a lawn mower is provided. The replaceable blade includes a central portion having an upper surface, a lower surface, opposing side edges, and an end extending between the side edges. The replaceable blade also includes a tip portion extending from the central portion. A plurality of apertures are formed through the central portion.

According to yet another aspect of the present invention, a replaceable blade for attachment to a mounting member of a lawn mower is provided. The replaceable blade includes a central portion having an upper surface, a lower surface, and a thickness extending between the upper surface and the lower surface. The replaceable blade includes a tip portion extending from the central portion. A first attachment mechanism is positioned on the central portion, and a second attachment mechanism is positioned on the central portion. The first and second attachment mechanisms selectively connect the central portion to the mounting member.

Advantages of the present invention will become more apparent to those skilled in the art from the following description of the embodiments of the invention which have been shown and described by way of illustration. As will be realized, the invention is capable of other and different embodiments, and its details are capable of modification in various respects.

BRIEF DESCRIPTION OF SEVERAL VIEWS OF THE DRAWINGS

These and other features of the present invention, and their advantages, are illustrated specifically in embodiments of the invention now to be described, by way of example, with reference to the accompanying diagrammatic drawings, in which.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION OF THE PREFERRED EMBODIMENT

Figure 1:
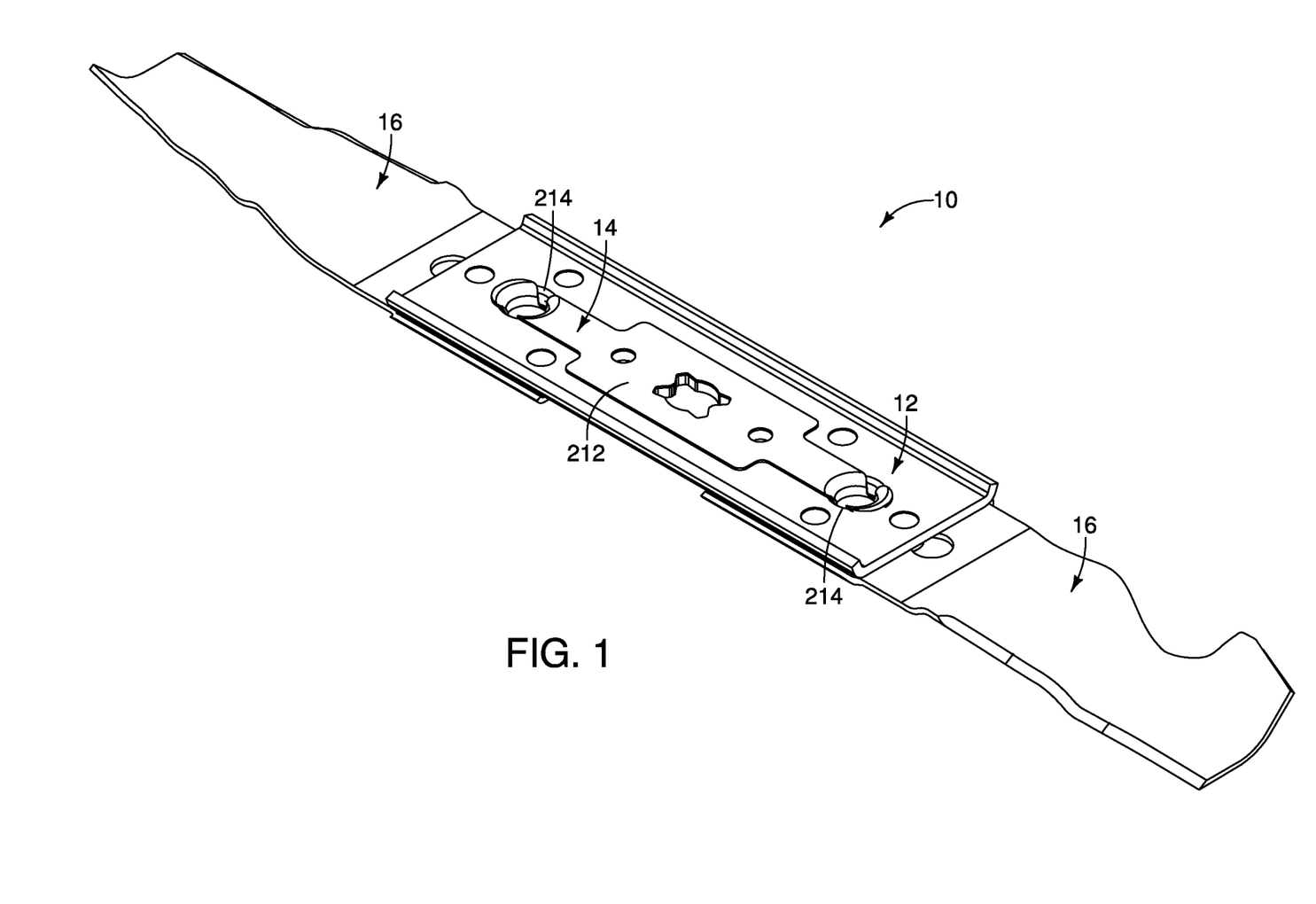
FIG. 1 is a top perspective view of an embodiment of a replacement mower blade assembly.
Figure 2:
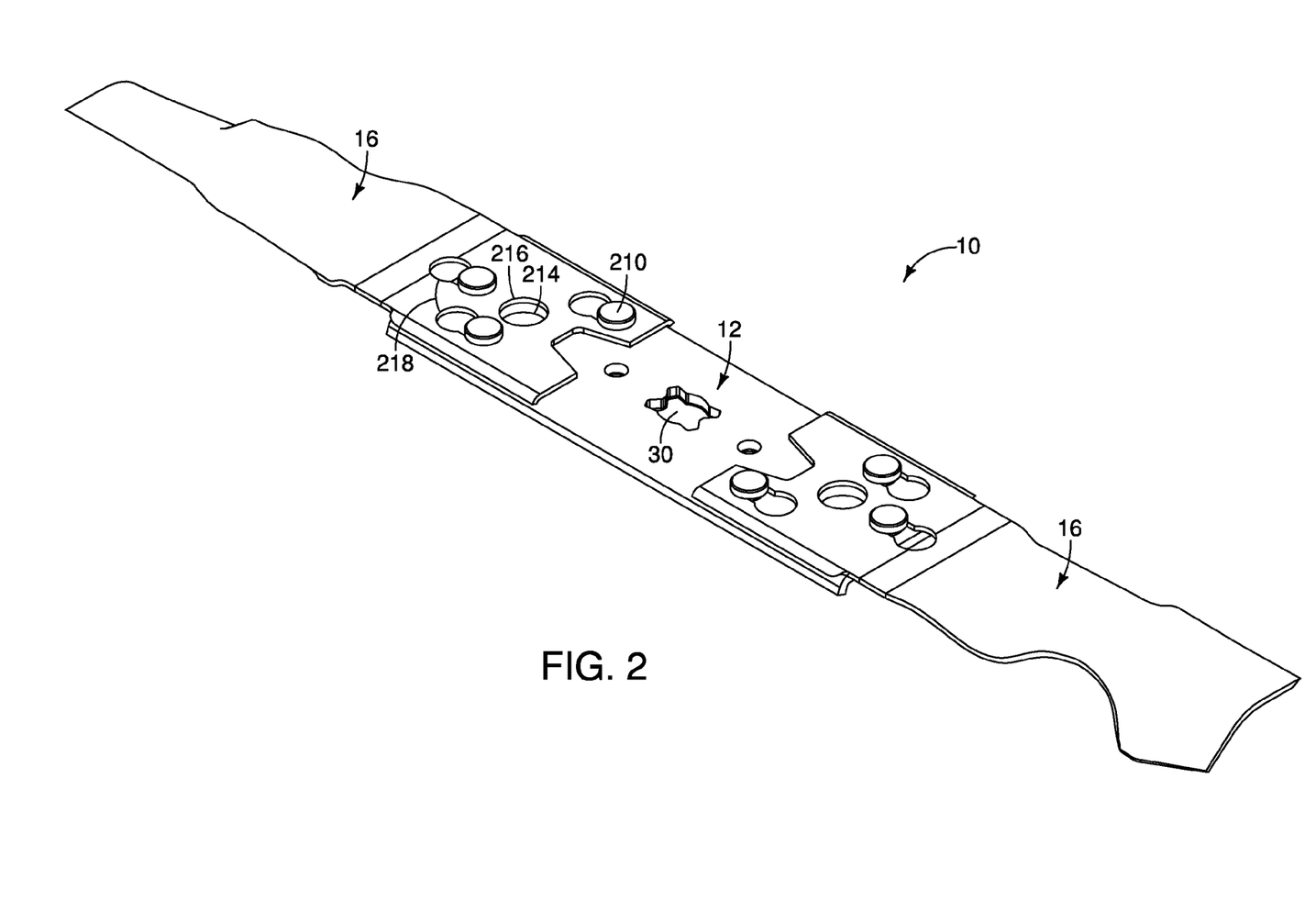
FIG. 2 is a bottom perspective view of the blade assembly shown in FIG. 1.

Referring to FIGS. 1-2, an exemplary embodiment of a replacement mower blade assembly 10 is shown. The blade assembly 10 includes a mounting member 12, a pair of opposing replaceable blades 16, and a plurality of attachment mechanisms for releasably attaching each of the replaceable blades 16 to the mounting member 12. The attachment mechanisms are configured to allow each blade 16 to be attachable to any end of the mounting member 12 while also preventing the blade 16 from being attached to the mounting member 12 in an upside-down manner. Improper attachment of the blade(s) 16 to the mounting member 12 causes a rotational imbalance of the blade assembly 10 which, in turn, causes immediate wear-and-tear on the engine and rotational components thereof due to the shaking and vibrations caused by the rotational imbalance of the blade assembly 10. The mounting member 12 is operatively positioned within a cutting deck of any type of lawn mower, including a walk-behind style lawn mower, a garden tractor, a riding lawn mower, or the like. In an embodiment, the blade assembly 10 is connected to a motor or engine crankshaft (not shown) that extends downwardly through the cutting deck. In another embodiment, the blade assembly 10 is connected to a rotatable spindle (not shown) located within a cutting deck. The blade assembly 10 is removably connected within the deck and is rotatable about a substantially vertical rotational axis defined by the motor or engine crankshaft or the spindle to which it is attached.

In the exemplary embodiment illustrated in FIGS. 1-4, the mounting member 12 is an elongated structural member that provides a base for receiving at least one removably attachable replacement blade 16. The mounting member 12 includes a first end 18, a second end 20 opposite the first end 18, an upper surface 22, an opposing lower surface 24, a first side edge 26 extending between the opposing ends 18, 20, and an opposing second side edge 28. The upper and lower surfaces 22, 24 form a substantially planar central portion of the mounting member 12. In the illustrated exemplary embodiment, the opposing side edges 26, 28 extend from the central portion in a curved manner. In an embodiment, the side edges 26, 28 are curved upwardly relative to the upper surface 22 of the mounting member 12. In the illustrated exemplary embodiment, the side edges 26, 28 are curved in a corresponding direction such that the mounting member 12 has a C-shaped or channel-shaped cross-section. The C-shaped cross-sectional shape increases the beam strength of the mounting member 12. It should be understood by one of ordinary skill in the art that the mounting member 12 may also have any other similar cross-sectional shape that increases the beam strength. The curved side edges 26, 28 provide additional structural stiffness or rigidity to the mounting member 12 to resist longitudinal bending and torsional rotation while minimizing losses in efficiency due to contact with the cut grasses. In an embodiment, the side edges 26, 28 are curved relative to the upper surface 22 at an angle of between about 30° to 90°. In another embodiment, the opposing side edges 26, 28 of the mounting member 12 are curved downwardly toward the lower surface 24 of the mounting member 12. In yet another embodiment, the central portion of the mounting member 12 is substantially planar between the opposing side edges 26, 28 such that the opposing side edges 26, 28 are not curved and remain substantially coplanar with the upper and lower surfaces 22, 24.

Figure 3:
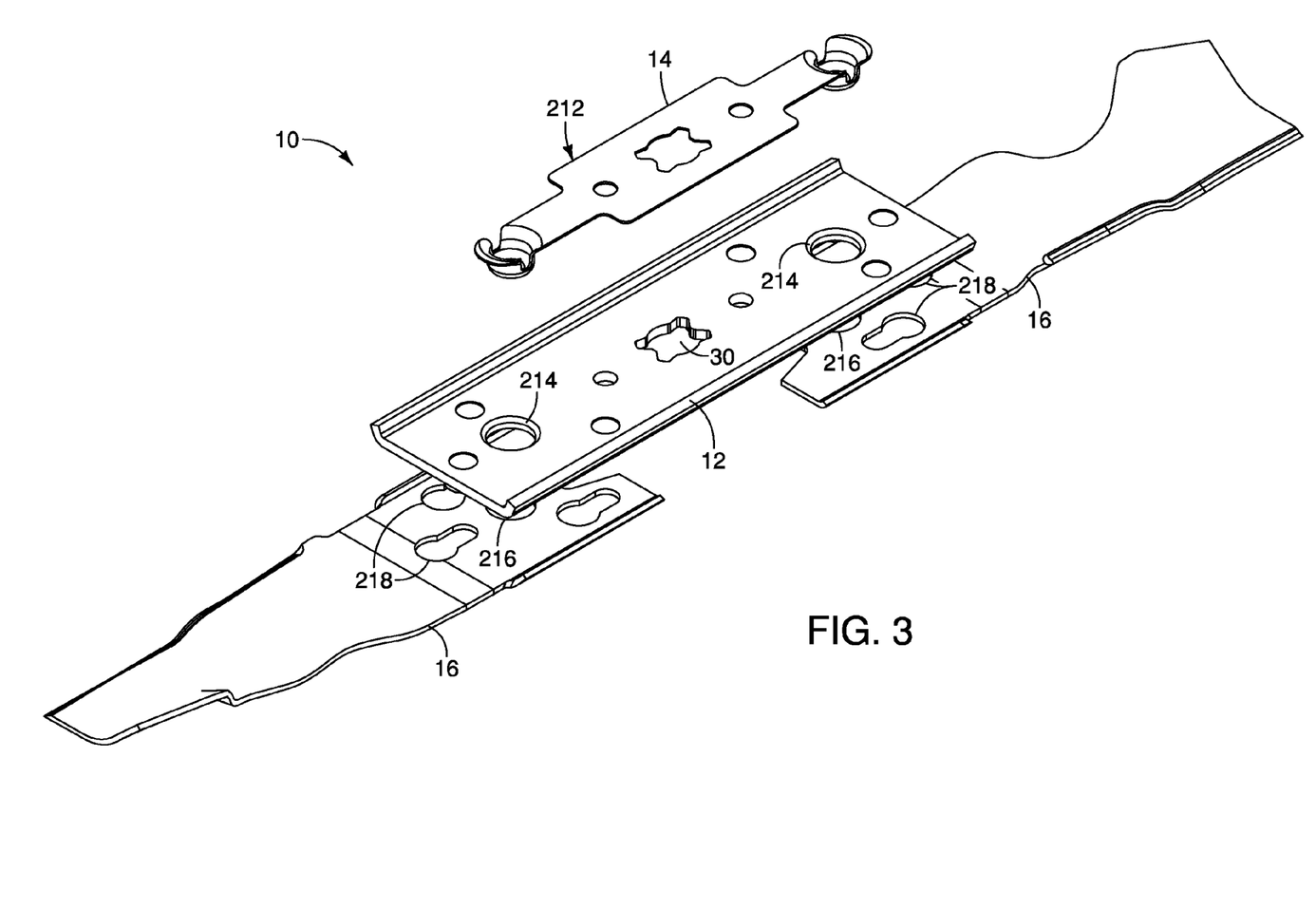
FIG. 3 is an exploded view of the blade assembly shown in FIG. 1.
Figure 4:
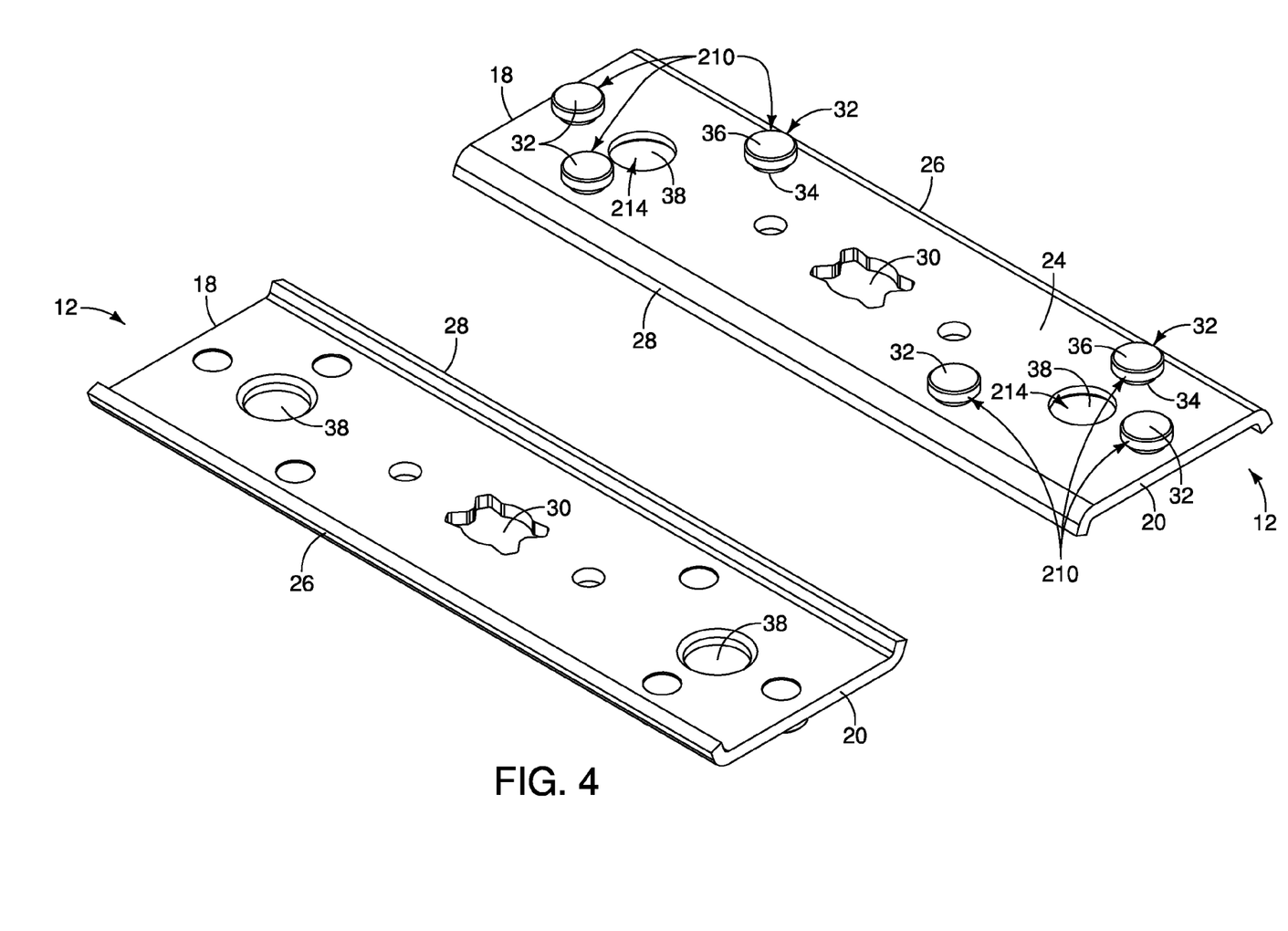
FIG. 4 is top and bottom perspective views of an exemplary embodiment of a mounting member.
Figure 7:
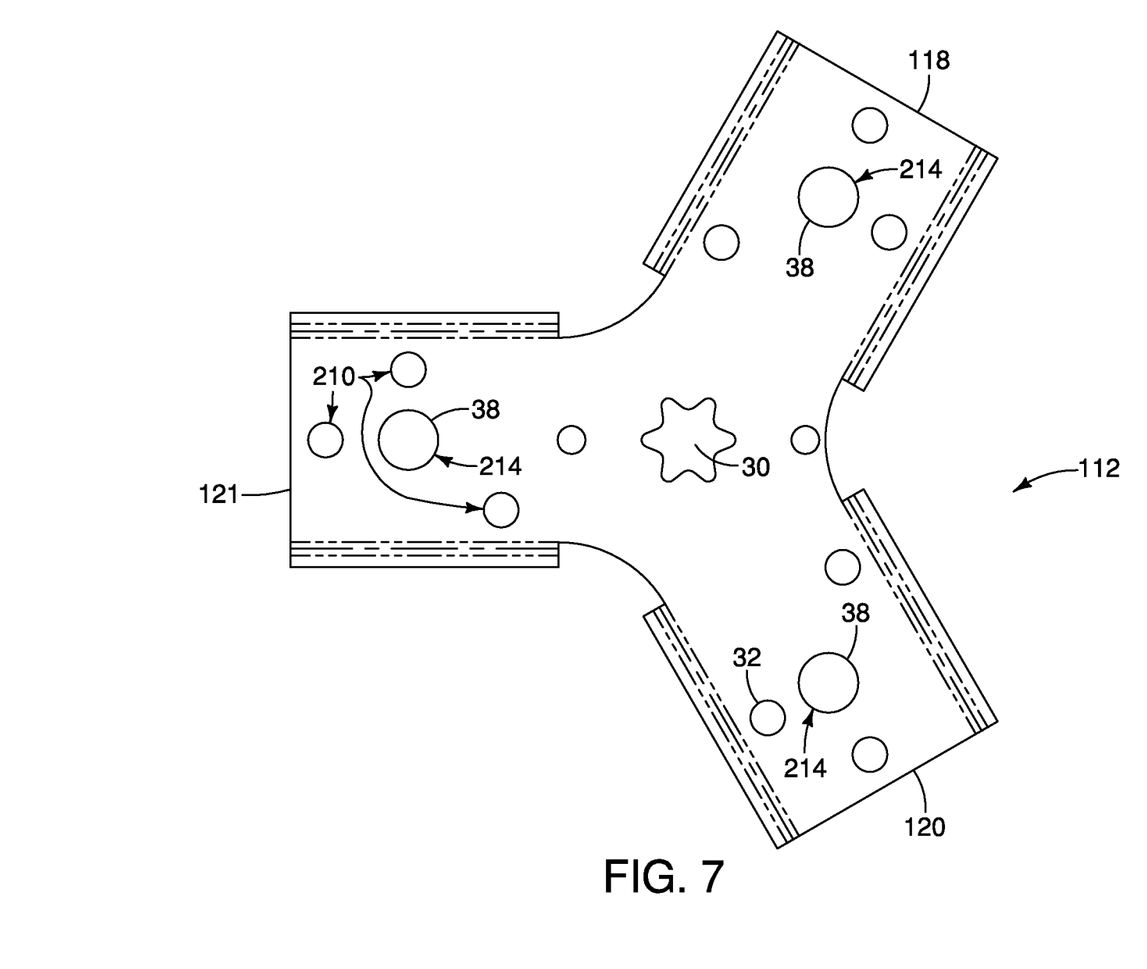
FIG. 7 is a top view of another exemplary embodiment of a mounting member.

In an embodiment, the mounting member 12 includes a central bore 30 formed through the thickness thereof, as shown in FIGS. 1-4. The central bore 30 is sized and shaped to receive a rotatable driving member such as a motor or engine crankshaft, a spindle, an adaptor, or any other rotatable member configured to be positioned within the central bore to cause the blade assembly 10 to selectively rotate about an axis substantially perpendicular to the upper surface 22. In an embodiment, the central bore 30 has a generally elongated X-shape, as shown in FIG. 4. In another embodiment, the central bore 30 has a six-point star shape, as shown in FIG. 7. It should be understood by one of ordinary skill in the art that the central bore 30 can be formed of any shape sufficient to receive a rotatable member that causes the blade assembly 10 to rotate thereabout.

In the exemplary embodiment illustrated in FIGS. 1-4 and 6, the mounting member 12 includes a first attachment mechanism 210 formed of a plurality of caps 32 extending from the mounting member 12 for providing a releasable attachment between the replacement blades 16 and the mounting member 12. The first attachment mechanism 210 is positioned adjacent to both the first end 18 and the opposing second end 20 thereof. The first attachment mechanism 210 provides a male portion of a male-female connection. In another embodiment, the first attachment mechanism 210 operatively connected to the mounting member 12 may include the female portion of a male-female connection. Each first attachment mechanism 210 on the mounting member 12 is configured to cooperate with a corresponding attachment mechanism operatively connected to each blade 16. It should be understood by one of ordinary skill in the art that the first attachment mechanism 210 can be formed of any mechanical connection that allows for a tool-less quick-release and quick-attachment of a blade 16 to a distal end 18, 20 of the mounting member 12.

In an embodiment, the first attachment mechanism 210 is located adjacent to both the first end 18 and the second end 20 of the mounting member 12, wherein each first attachment mechanism 210 includes at least one cap 32 that extends perpendicularly away from the lower surface 24 of the mounting member 12. The illustrated exemplary embodiment of the first attachment mechanism 210 includes three caps 32 extending from the lower surface 24 of the mounting member 12, as shown in FIG. 4. It should be understood by one of ordinary skill in the art that although the illustrated embodiment includes three (3) caps 32, the first attachment mechanism 210 can include any number of caps extending from the lower surface 24 of the mounting member 12. The caps 32 protrude from the mounting member 12, and each cap 32 includes a base 34 that extends substantially linearly away from the lower surface 24 and a flange 36 that extends substantially perpendicular and radially from the base 34. The flange 36 is spaced apart relative to the lower surface 24, thereby providing a shoulder bolt having a gap between the base 34 and the outer radial edge of the flange 36 to create a shoulder between the flange 36 and the lower surface 24 of the mounting member 12.

In an embodiment, the base 34 is a cylindrical member having a circular cross-sectional shape extending from the lower surface 24 of the mounting member 12. In another embodiment, the cross-sectional shape of the base 34 can be oval, triangular, square, or the base 34 may include a plurality of vertically-oriented splines, a keying protrusion, half of a yin/yang, or any symmetrical or non-symmetrical shape. In an embodiment, the flange 36 is a round, substantially flat plate mounted atop the end of the base 34. In another embodiment, the planar shape of the flange 36 can also be square, tear-dropped, half of a yin/yang, M-shaped, oval, square, triangular, or any symmetrical or non-symmetrical shape. It should be understood by one of ordinary skill in the art that the base 34 and flange 36 can be any shape sufficient to allow the blades 16 to be releasably attachable to the mounting member 12 by way of the caps 32. It should also be understood by one of ordinary skill in the art that the caps 32 can be formed of separate parts such as the bases 34 and flanges 36 formed separately and then fixedly attached to each other or they could be integrally formed together in which the bases 34 and the flanges 36 are formed as a single member. In an embodiment, the base 34 and flange 36 of each cap 32 has the same size and shape. In another embodiment, at least one cap 32 is sized differently than the other caps 32. For example, one cap 32 may include a larger base 34, a larger flange 36, or a combination of both relative to the other caps 32. Alternatively, one cap 32 may have a square base 34, a square flange 36, or a combination of both while all other caps 32 have a circular base and circular flange 36. In still another alternative example, one cap 32 may have a circular base 34 and a square flange 36 while all other caps 32 have a circular base and circular flange 36. Providing a first attachment mechanism 210 with one cap 32 different than the others can assist in ensuring that the blade 16 cannot be attached to the mounting member 12 in an upside-down manner.

In the exemplary embodiment illustrated in FIG. 4, all of the caps 32 of the first attachment mechanism 210 positioned adjacent to each opposing distal end 18, 20 extend from the lower surface 24 of the mounting member 12. In another embodiment, all of the caps 32 for the first attachment mechanism 210 for connecting the blades 16 to a respective end of the mounting member 12 extend from a surface of the blade 16 and the caps 32 are received by the mounting member 12. In yet another embodiment, at least one of the caps 32 from a first attachment mechanism 210 extends from the lower surface 24 of the mounting member 12 and at least another cap 32 extends from the corresponding blade 16, wherein each of the caps 32 is configured to assist in attaching the blade 16 to the mounting member 12.

The function of the caps 32 of the first attachment mechanism 210 is to allow the replacement blades 16 to be selectively and releasably connectable to the mounting member 12, as will be explained below. In the illustrated exemplary embodiment, the caps 32 of each of the first attachment mechanism 210 positioned adjacent to the first and second ends 18, 20 of the mounting member form two opposing patterns of caps 32, wherein each pattern includes three (3) caps 32. Each first attachment mechanism 210 should include at least one cap 32, wherein the cap(s) form a pattern. It should be understood by one of ordinary skill in the art that the first attachment mechanism 210 may include any number of caps 32 for operatively connecting a replacement blade 16 to the mounting member 12, but a pattern having at least three caps 32 is preferable to more evenly distribute the stresses transferred to the mounting member 12 by the replacement blades 16 while utilizing the fewest number of caps 32. In the illustrated embodiment, each first attachment mechanism 210 includes a pattern of three caps 32, and the pattern of caps 32 can be arranged such that the linear alignment between any two of the caps 32 is not parallel to the longitudinal or transverse axes of the replacement blade 16 or the mounting member 12 to which they are attached. In another embodiment, at least two of the caps 32 of a first attachment mechanism 210 are aligned such that the linear alignment of the caps 32 is parallel or perpendicular to the longitudinal axis of the mounting member 12. In an embodiment, the pattern of the caps 32 of each first attachment mechanism 210 is identical such that a replacement blade 16 having a pattern of connecting mechanism that cooperates with the caps 32 can be attached to either end of the mounting member 12. In another embodiment, the pattern of the caps 32 of the opposing first attachment mechanisms 210 is different such that the replacement blades 16 are configured to be attachable to only one of the ends of the mounting member 12 without being attachable to any other end of the mounting member. In an embodiment, the pattern of caps 32 forming the first attachment mechanism 210 is asymmetrical about the longitudinal axis of the blade 16, as shown in FIG. 4. In another embodiment, the pattern of caps 32 forming the first attachment mechanism 210 is symmetrical about the longitudinal axis of the blade 16.

The caps 32 can also be arranged in a pattern that ensures proper replacement blade orientation and alignment when installed, wherein the pattern allows the blade 16 to be attached such that the tip portion of the blade 16 is properly oriented during rotation. In an embodiment, the caps 32 are welded to the mounting member 12 or blade 16. In another embodiment, the caps 32 are riveted to the mounting member 12 or blade. It should be understood by one of ordinary skill in the art that the caps 32 can be attached to the mounting member 12 or the blade 16 in any manner so as to provide a fixed rigid connection therebetween. Although the first attachment mechanism 210 is described above as including a plurality of caps 32 for providing a male-female connection, it should be understood by one of ordinary skill in the art that the first attachment mechanism 210 can include any form of male or female connector that is receivable by a corresponding female or male connector of an attachment mechanism for connecting a blade 16 to the mounting member 12.

Figure 5:
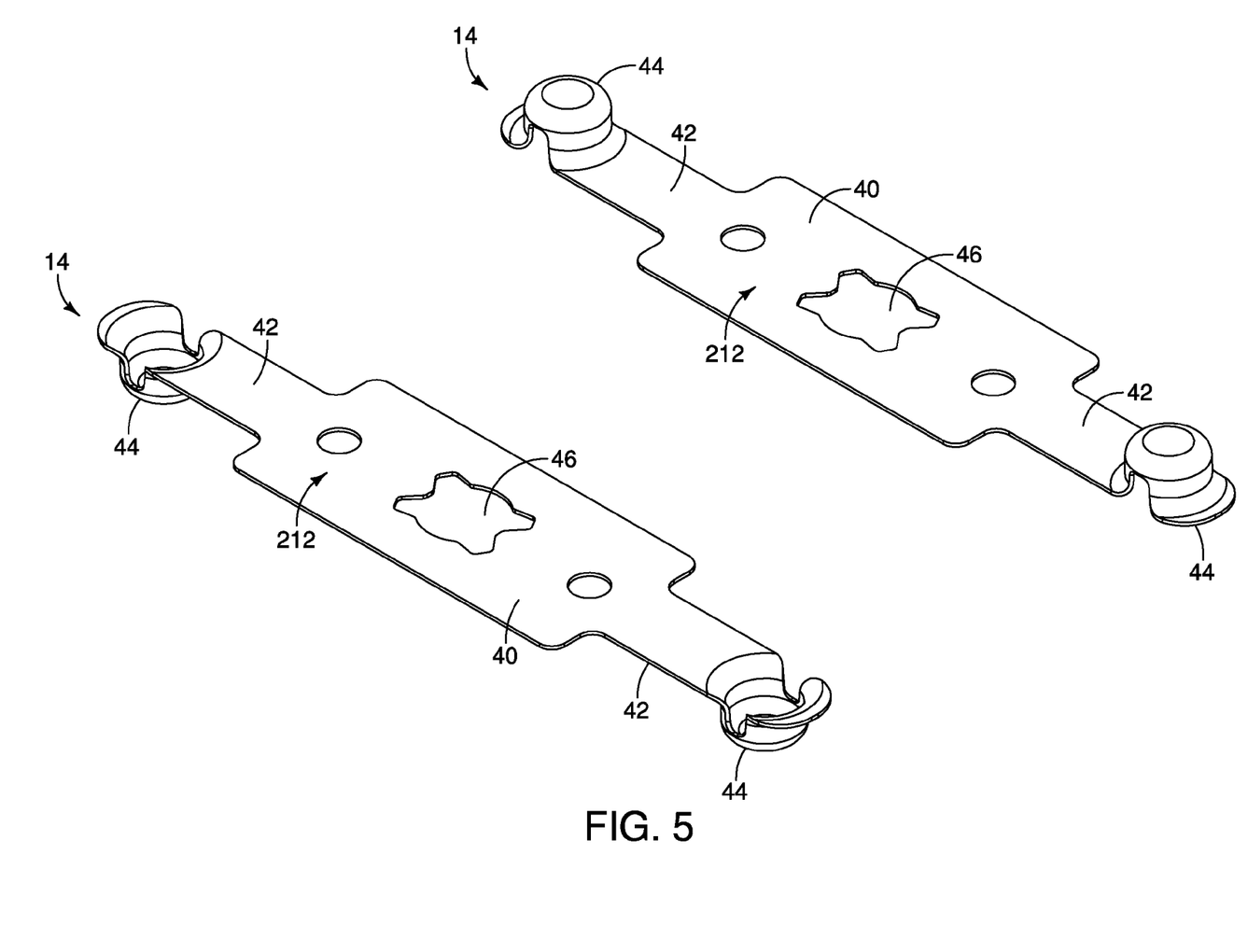
FIG. 5 is top and bottom perspective views of an exemplary embodiment of a locking mechanism.

In an embodiment, a second attachment mechanism 212 for releasably connecting the blades 16 to the mounting member 12 is formed as an indexing member 14, as shown in FIGS. 1, 3, and 5. The indexing member 14 of the second attachment mechanism 212 cooperates with a corresponding attachment mechanism included on both the mounting member 12 and each blade 16 for receiving the indexing member 14, as will be explained below. The attachment mechanism on the mounting member 12 configured to receive the indexing member 14 is a third attachment mechanism 214 positioned adjacent to both the first and second distal ends 18, 20 thereof. Each third attachment mechanism 214 included on the mounting member 12 is formed of an indexing aperture 38 formed through the thickness of the mounting member 12, as shown in FIG. 4, thereby providing the mounting member 12 with a plurality of third attachment mechanisms 214. The indexing aperture 38 of each blade 16 is configured to receive the indexing member 14 when the respective blade 16 is properly aligned and attached to the mounting member 12. In the illustrated exemplary embodiment shown in FIG. 4, the indexing apertures 38 have a substantially circular shape, but it should be understood by one of ordinary skill in the art that the indexing apertures 38 can be formed as any shape that corresponds to the pins 44 of the indexing member 14.

As explained above and shown in FIGS. 1-3 and 5, the second attachment mechanism 212 is formed as an indexing member 14. Cooperating and corresponding indexing apertures 38, 60 are formed into the mounting member 12 and replacement blades 16 for receiving the indexing member 14 when each blade 16 is positively positioned with respect to the mounting member 12. In an embodiment, the indexing member 14 is fixedly attached to the mounting member 12. In another embodiment, the mounting member 12 is positioned adjacent to the upper surface 22 of the mounting member 12 and is secured in a sandwiching manner between the mounting member 12 and the motor or engine crankshaft, the spindle, or an adaptor attached to the crankshaft or spindle. The indexing member 14 is an elongated member having a rectangular base 40, a pair of arms 42 extending from opposing ends of the base 40, and a pin 44 or tab extending from the end of each arm 42 opposite the base 40. It should be understood by one of ordinary skill in the art that the indexing member 14 may be formed of any shape. The pins 44 are biased toward engagement with both the mounting member 12 and the blades 16 due to the cantilever configuration of the pins 44 being positioned at the distal end of the arms 42 with the base 40 being substantially stationary or otherwise operatively secured to the mounting member 12. Each pin 44 is movable or actuatable for selectively releasing or engaging a replacement blade 16 and the mounting member 12, as will be explained below. In an embodiment, the arms 42 are aligned with the base 40, and each arm 42 has a width that is smaller than the width of the base 40. Although the arms 42 are illustrated as having a smaller width than the base 40 in the exemplary embodiment, it should be understood by one of ordinary skill in the art that the base 40 can also include the arms 42 such that the pins 44 extend from the base 40 which has a substantially consistent width along the length thereof. The arms 42 and the elongated base 40 are configured to act as cantilever springs when the indexing member 14 is secured about the central aperture 46. The pins 44 extend away from the plane of the base 40 and arms 42, wherein the pins 44 are configured to extend through the indexing aperture 38 (FIG. 4) of the mounting member 12. Each pin 44 is configured to be selectively engaged with a replacement blade 16.

Figure 6:
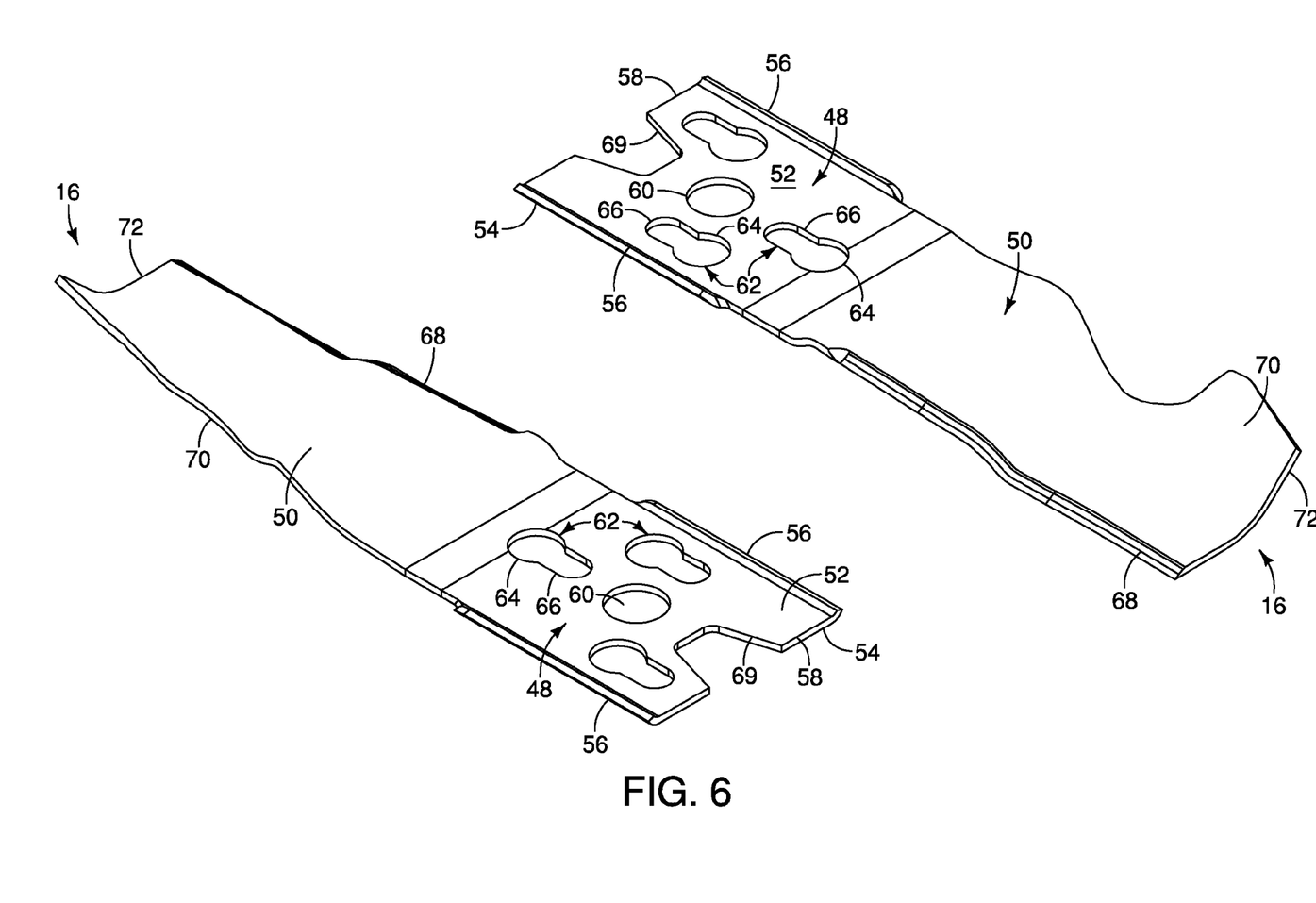
FIG. 6 is top and bottom perspective views of an exemplary embodiment of a cutting blade.

FIG. 6 illustrates an exemplary embodiment of a replaceable replacement blade 16 that is configured to be selectively attachable to either the first end 18 or the second end 20 of the mounting member 12. The replacement blade 16 includes a central portion 48 and a tip portion 50 integrally formed with and extending from the central portion 48. The central portion 48 is configured to be operatively connected to the mounting member 12 while the tip portion 50 extends beyond the corresponding distal end 18, 20 of the mounting member 12 for cutting grass and vegetation. The central portion 48 includes an upper surface 52, a lower surface 54, opposing side edges 56, and at least one attachment mechanism. In the illustrated exemplary embodiment, the central portion 48 of the blade includes a fourth attachment mechanism 216 and a fifth attachment mechanism 218. The upper and lower surfaces 52, 54 form a substantially flat body, and the opposing sides edges 56 extend from the body in a curved or formed angular sections. In an embodiment, the side edges 56 of the replacement blade 16 have a similar curvature as the first and second side edges 26, 28 of the mounting member 12 such that when the replacement blade 16 is attached to the mounting member 12, the curved edges of both the mounting member 12 and the blade 16 form a nesting arrangement. The matching channel shapes of the central portion 48 of the replacement blade 16 and the mounting member 12 reduce the shear loading of the caps 32 during conditions such as blade impact, whereby a majority of impact energy between the replacement blade 16 and the object being impacted is diverted from shear to tension. The central portion 48 includes a first end 58 extending between the opposing side edges 56. In an embodiment, the first and second side edges 56, 58 are substantially aligned with the upper and lower surfaces 54, 56 in a co-planar manner, thereby forming a flat central portion 48. In the illustrated embodiment, the first end 58 includes a notch 69 formed therein, wherein the notch 69 is configured to provide clearance between the central portion 48 of the replacement blade 16 and an adapter (not shown) which is used to attach the replacement blade 16 to an engine crankshaft.

As shown in FIG. 6, an exemplary embodiment of the central portion 48 of the replacement blade 16 includes the fourth attachment mechanism 216 which is an indexing aperture 60 formed into the replacement blade 16 for receiving the indexing member 14. The indexing aperture 60 of the replacement blade 16 is configured to be alignable with the indexing aperture 38 of the mounting member 12 when the replacement blade 16 is properly seated against and attached to the mounting member 12. The indexing aperture 60 can be formed as any shape, but the shape of the indexing aperture 60 should be shaped to correspond to the shape of the indexing aperture 38 of the mounting member 12 and the shape of the pin 44 of the indexing member 14.

The indexing aperture 60, forming the fourth attachment mechanism 216 in the illustrated exemplary embodiment, is surrounded by the fifth attachment mechanism 218 which is formed as a plurality of locking apertures 62, wherein each of the locking apertures 62 is configured to receive a corresponding cap 32 extending from the mounting member 12 for selectively attaching the blade 16 to the mounting member 12. In the embodiment illustrated in FIG. 6, the locking apertures 62 are formed as keyhole apertures which include a receiving portion 64 and a channel portion 66. The receiving portion 64 is a rounded hole formed through the thickness of the central portion 48 of the replacement blade 16. The receiving portion 64 is sized to allow the flange 36 of the cap 32 to pass through. The channel portion 66 is an elongated channel extending from the receiving portion 64. The channel portion 66 is sized to be substantially the same (or slightly larger) than the outer diameter of the base 34 of the cap 32 such that the base 34 is capable of sliding along the channel portion 66. The end of the channel portion 66 opposite the receiving portion 64 is configured to be a stop to prevent the replacement blade 16 from sliding past the end of the mounting member 12. It should be understood by one of ordinary skill in the art that although the locking apertures 62 are described above as keyhole apertures, the locking apertures 62 can also be formed as any shape sufficient to receive the corresponding caps 32 of the mounting member for positively securing each replacement blade 16 an end of the mounting member 12. Also, the fifth attachment mechanism 218 is described as locking apertures 62, or a female portion of a male-female connection, but it should be understood by one of ordinary skill in the art that the fifth attachment mechanism 218 may also be the male portion of a male-female connection or any other portion of a mechanical connection that allows the replacement blades 16 to be easily attachable and removable from the mounting member 12 without the use of tools.

The tip portion 50 of the replacement blade 16 extends from the central portion 48 opposite the first end 58, as shown in FIGS. 1-3 and 6. The tip portion 50 of the replacement blade 16 can be shaped and configured for different operational purposes, such as grass cutting, material collection, mulching, "rough cut", blowing, or the like. For example, for grass cutting operations, the tip portion 50 of the replacement blade 16 includes a sharpened edge configured to cut grass. High-quality grass cutting operations, such as "finish cutting" the replacement blades 16 need to be stable and solidly retained to provide the highest quality of cut and safe operation. "Rough cut" grass cutting operations may have a sharpened edge for cutting grass and other vegetation, but the replacement blade 16 may include a pivot portion that pivots during the cutting operation which produces a reduced quality of cut relative to a finish cut blade. The "rough cut" blade may also include a filament attachment means. For grass cutting operations, the edge of the replacement blade 16 opposite the sharpened cutting edge may form a sail or raised portion that produces increased air pressure above the replacement blade 16 and reduced air pressure below so as to create lift for the grass and clippings. For a blower operation, the tip portion 50 can be shaped like an impeller such that the air movement into and out of the cutting deck in enhanced. This blower operation can be useful in clearing walkways, driveways, or the like. In other embodiments, the tip portion 50 can be formed to perform any of these or other operations, or any combination thereof.

In the illustrated embodiment, the tip portion 50 of the replacement blade 16 is configured as a mulching blade for not only cutting grass and vegetation but also to circulate the cut grass and vegetation for additional contact and cutting to reduce the size of the particles for ease of assimilation into the grass. As shown in FIG. 6, the tip portion 50 extends from the central portion 48 and includes a leading edge 68, a trailing edge 70, and a distal end 72 extending between the leading and trailing edges 68, 70 and located at the end of the tip portion 50 opposite the central portion 48. The leading edge 68 is sharpened for cutting grass and other vegetation. In an embodiment, the leading edge 68 is substantially linear between the central portion 48 and the distal end 72. In the illustrated embodiment, the leading edge 68 extends between the central portion 48 and the distal end 72 in a nonlinear manner, wherein the leading edge 68 includes a transition such that the portion of the leading edge 68 adjacent to the central portion 48 is substantially coplanar therewith and the portion of the leading edge 68 adjacent to the distal end 72 is vertically lower than the central portion 48. In an embodiment, the leading edge 68 is sharpened the entire distance between the central portion 48 and the distal end 72 of the replacement blade 16. In another embodiment, the leading edge 68 of the replacement blade 16 is sharpened only a portion of the distance between the central portion 48 and the distal end 72. In an embodiment, the trailing edge 70 extending between the central portion 48 and the distal end 72 is substantially linear. In the illustrated embodiment, the portion of the trailing edge 70 adjacent to the distal end 72 is curved or formed angularly upwardly, thereby forming a sail or the like. This sail is configured to create lift, or a pressure differential between the area above the tip portion 50 and below the tip portion 50. The lift generated by the sail causes the cut grass and vegetation to be lifted and recirculated such that the sharpened leading edge 68 can cut the vegetation multiple times and reduce the particle size thereof. In another embodiment, the sail can be designed primarily to lift and eject the cut grass for discharge and collection purposes.

In an embodiment, the replacement blades 16 are formed of the same material as the mounting member 12 to which they are attached. In another embodiment, the replacement blades 16 are formed of a different material than the mounting member 12, wherein the material used for the replacement blades 16 can be chosen to optimize wear resistance properties as well as provide a high hardness for durability. In yet another embodiment, the mounting member 12 may be formed of a different material than the replacement blades 16, wherein the material used for the mounting member 12 can be chosen to optimize the energy absorption properties of the mounting member 12 to increase durability and reduce the stresses and wear-and-tear on the replacement blades 16.

Initial assembly of the blade assembly 10 includes positioning the indexing member 14 immediately adjacent to the upper surface 22 of the mounting member 12 such that the central aperture 46 of the indexing member 14 and the central bore 30 of the mounting member 12 are substantially aligned. Then, each pin 44 of the indexing member 14 extends through a corresponding indexing aperture 38 in the mounting member 12. Once the pins 44 extend through the indexing apertures 38 and the central bore 30 receives the rotary drive mechanism, the mounting member 12 is positively secured to the rotatable engine or motor crankshaft or spindle (not shown) such that the curved first and second side edges 26, 28 are directed upwardly away from the ground. Securing the mounting member 12 to the motor or engine crankshaft or spindle also secures the indexing member 14 therebetween, thereby preventing movement or rotation of the indexing member 14 relative to the mounting member 12. A replacement blade 16 is then attached to mounting member 12 by aligning the receiving portion 64 of the locking apertures 62 of the replacement blade 16 with the flanges 36 of the caps 32 of the mounting member 12. The replacement blade 16 is then pushed against the mounting member 12 and pulled radially outward until the bases 34 of the caps 32 contact the ends of the channel portions 66 of the locking apertures 62. Once the caps 32 contact the ends of the locking apertures 62, the pins 44 of the indexing member 14 are biased by the spring configuration of the indexing member 14 into engagement with the indexing apertures 60 of the replacement blade 16 such that the pins 44 extend through both the mounting member 12 as well as the indexing apertures 60 of the replacement blade 16. The same method is used to attach a second replacement blade 16 to the opposing end of the mounting member 12.

In operation, as the blade assembly 10 rotates about the spindle, motor, or engine crankshaft to which it is attached, the centrifugal force on the replacement blades 16 ensures a positive attachment between the replacement blades 16 and the mounting member 12 by forcing the caps 32 of the mounting member into contact with the end of each receiving portion 64 of the locking aperture 62 of the replacement blade 16. The replacement blades 16 and the blade assembly 10 can be configured for clockwise or counterclockwise rotation about the spindle, motor, or engine crankshaft.

For toolless removal and replacement of one or both of the replacement blades 16 from the mounting member 12, the pin 44 positioned within the indexing aperture 60 of the replacement blade 16 being removed is pressed such that the pin 44 disengages from the replacement blade 16. Once the pin 44 has been pushed out of the indexing apertures 60 of the replacement blade 16, the replacement blade 16 is pushed toward the central bore 30 of the mounting member 12 in a sliding motion such that the bases 34 of the caps 32 slide into the receiving portions 64 of the locking apertures 62. The replacement blade 16 is then pulled downwardly away from the mounting member 12 as the flanges 36 pass through the receiving portions 64, thereby completely disengaging the replacement blade 16 from the mounting member 12. Replacement of the replacement blade 16 includes repeating the step described above for attaching the replacement blade 16 to the mounting member 12.

In another embodiment of the blade assembly 10, the replacement blade 16 includes the caps 32 extending therefrom while the mounting member includes the corresponding keyhole apertures.

Another exemplary embodiment of the mounting member 112 of the blade assembly 10 is shown in FIG. 7. The mounting member 112 includes a central bore 30 formed through the thickness thereof. The mounting member 112 further includes a first end 118, a second end 120, and a third end 121 extending radially outward relative to the central bore 30. In an embodiment, each of the ends 118, 120, 121 extend radially outward and oriented at about 120° relative to each other such that they are equally spaced from each other. In another embodiment, the angular orientation can be unequally spaced for noise abatement or other purposes. The three-end mounting member 112 allows for a replacement blade 16 to be attached to each of the ends 118, 120, 121, thereby providing a blade assembly 10 having three replacement blades 16. It should be understood by one of ordinary skill in the art that the pattern of caps 32 extending from the mounting member adjacent to each end should be the same for each end such that a single replacement blade 16 design can be used for all different variations of the mounting member.

Figure 8:
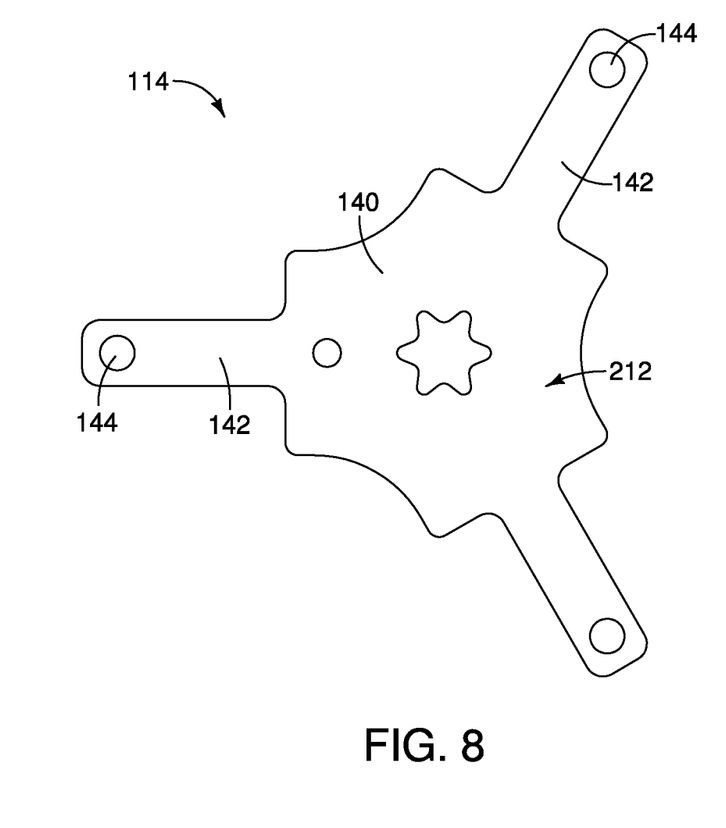
FIG. 8 is a top view of another exemplary embodiment of a locking mechanism.

As shown in FIG. 8, another exemplary embodiment of the indexing member 114 is shown. The indexing member 114 includes a base 140 and three arms 142 extending from the base 140. The arms 142 are oriented at about 120° relative to each other. A pin 144 is located at the end of each arm 142 opposite the base 140. The indexing member 114 is configured to be positioned immediately adjacent to the mounting member 112 such that each of the pins 144 engages a corresponding indexing aperture of the mounting member 112. It should be understood by one of ordinary skill in the art that although the illustrated embodiments of the mounting member 12, 112 and indexing member 14, 114 have a 2- or 3-end shape, any number of a plurality of ends and arms can extend from the central bore 30 provided that the blade assembly 10 remains balanced about the central bore 30 as it rotates.

In an embodiment, the mounting member 12, the indexing member 14, and the replacement blades 16 are all formed of the same material. In another embodiment, the replacement blade 16 can be formed of a different material than the mounting member 12, thereby providing desirable properties to the replacement blade 16 which can increase the quality of cut of the sharpened edge while the material of the mounting member 12 can provide the strength and rigidity to allow for longer life of the replacement blades 16.

The blade assembly 10, as shown and described above, allows for replacement blades 16 to be easily attached or detached without the use of tools. Instead, the pins are actuatable, or pushable, which allows a replacement blade to be detachable from the mounting member. The pins also ensure proper engagement between the cutting blades and the mounting member by way of an indexing or positive locating attachment due to the biasing of the pins into engagement with the indexing apertures formed through both the mounting member and the blades.

In each of the exemplary embodiments of the blade assembly 10, the replaceable replacement blades 16 are attachable to an end of the mounting member 12. The blade assembly 10 includes at least one attachment mechanism configured to cooperate with corresponding attachment mechanism(s) to positively position and retain each replacement blade 16 to the mounting member 12 until an operator selectively removes or otherwise disengages one or more of the replacement blades 16 from the mounting member 12. For example, in the embodiment in which the first attachment mechanism 210 is a plurality of caps 32 extending from either the mounting member 12 or a blade 16, and the first attachment mechanism 210 corresponds with the fifth attachment mechanism 218 that includes a plurality of locking apertures 62 formed into the other of the mounting member 12 or replacement blade 16. This connecting mechanism allows each of the replacement blades 16 to be secured to the mounting member 12. Another connecting mechanism includes the second attachment mechanism 212 which is formed as the indexing member 14 that has a pin 44 positioned at a distal end of each arm 42, wherein each pin 44 is received within a corresponding third attachment mechanism 214 formed as an indexing aperture 38 through the mounting member and a corresponding fourth attachment mechanism 216 formed as an indexing aperture 60 through each replacement blade 16. As such, when the replacement blade(s) 16 is properly aligned with an end of the mounting member 12, the pin 44 is biased into both indexing apertures 38, 60 to positively locate the replacement blade 16 relative to the corresponding end of the mounting member 12. It should be understood by one of ordinary skill in the art that other attachment mechanisms can be used to positively secure and position the replacement blades 16 relative to the mounting member 12.

While preferred embodiments of the present invention have been described, it should be understood that the present invention is not so limited and modifications may be made without departing from the present invention. The scope of the present invention is defined by the appended claims, and all devices, processes, and methods that come within the meaning of the claims, either literally or by equivalence, are intended to be embraced therein.

What is claimed is:

1. A replaceable blade for attachment to a first distal end or a second distal end of a mounting member that is attachable to a rotatable spindle or engine crankshaft of a lawn mower, said blade comprising:
    a central portion having an upper surface, a lower surface, opposing side edges, and an end extending between said side edges, wherein said opposing side edges are curved, and wherein said opposing side edges are curved upwardly relative to said upper surface;
    a tip portion extending from said central portion opposite said end; and
    at least one attachment mechanism, wherein each of said at least one attachment mechanism is located on said central portion to allow said central portion to be releasably attachable to said mounting member.

2. The replaceable blade of claim 1, wherein one of said at least one attachment mechanism is a plurality of locking apertures formed through said central portion.

3. The replaceable blade of claim 2, wherein each of said plurality of locking apertures is formed as keyhole aperture.

4. The replaceable blade of claim 2, wherein another of said at least one attachment mechanism is an indexing aperture formed through said central portion, and wherein said indexing aperture is surrounded by said plurality of locking apertures.

5. The replaceable blade of claim 1, wherein one of said at least one attachment mechanism is an indexing aperture formed through said central portion.

6. The replaceable blade of claim 1, wherein one of said at least one attachment mechanism is a plurality of caps extending from said upper surface of said central portion.

7. A replaceable blade for attachment to a first distal end or a second distal end of a mounting member that is attachable to a rotatable spindle or an engine crankshaft of a lawn mower, said blade comprising:
    a central portion having an upper surface, a lower surface, and opposing side edges;
    a tip portion extending from said central portion; and
    a plurality of apertures formed through said central portion to allow said central portion to be releasably attachable to said mounting member, wherein alignment of any two of said plurality of apertures is non-parallel relative to both a longitudinal axis and a lateral axis of said central portion.

8. The replaceable blade of claim 7, wherein at least two of said plurality of apertures formed through said central portion are formed as keyhole apertures.

9. The replaceable blade of claim 7, wherein one of said plurality of apertures is an indexing aperture.

10. The replaceable blade of claim 7, wherein said plurality of apertures comprise a first attachment mechanism and a second attachment mechanism.

11. The replaceable blade of claim 10, wherein said first attachment mechanism includes one of said plurality of apertures formed as an indexing aperture.

12. The replaceable blade of claim 10, wherein said second attachment mechanism includes at least two of said plurality of apertures formed as locking apertures.

13. The replaceable blade of claim 12, wherein said locking apertures are formed as keyhole apertures.

\* \* \* \* \*